United States Patent [19]
Möder et al.

[11] 3,848,116
[45] Nov. 12, 1974

[54] DATA PROCESSING SYSTEM HAVING TRIPLEXED SYSTEM UNITS

[75] Inventors: Hans-Ulrich Möder; Günter Grossman, both of Munich, Germany

[73] Assignee: Siemens Aktiengesellschaft, Berlin and Munich, Germany

[22] Filed: Jan. 5, 1973

[21] Appl. No.: 321,271

[30] Foreign Application Priority Data
Jan. 18, 1972 Germany.............................. 2202231

[52] U.S. Cl. ......................................... 235/153 AE
[51] Int. Cl. ............................................. G06f 11/08
[58] Field of Search ..... 235/153 AE; 340/146.1 BE, 340/172.5

[56] References Cited
UNITED STATES PATENTS

| | | | |
|---|---|---|---|
| 3,302,182 | 1/1967 | Lynch et al. ................. | 235/153 AE |
| 3,609,704 | 9/1969 | Schurter....................... | 235/153 AE |
| 3,624,372 | 11/1971 | Philip et al. .................. | 235/153 AE |
| 3,665,173 | 5/1972 | Bouricius et al. ............ | 235/153 AE |
| 3,681,578 | 8/1972 | Stevens........................ | 235/153 AE |
| 3,735,356 | 5/1973 | Yates............................ | 340/172.5 |

*Primary Examiner*—Charles E. Atkinson

[57] ABSTRACT

A circuit arrangement for detecting and isolating malfunctioning system units of a program controlled data processing system, wherein the system units are processing units and storage units. The system units are duplicated for increasing operational reliability. In the processing system constituting triplicated and/or duplicated system units each of the processing units is connected to the storage units through triple standard connections. A combination of a comparator and a majority logic circuit is connected after each standard connection of a system unit for incoming data traffic. This connection is such that each comparator is connected to two standard connections, and the majority logic circuit is connected to two standard connections. Thus, the comparator evaluates data received at two standard connections, and the majority logic evaluates data received at three standard connections.

3 Claims, 4 Drawing Figures

DATA PROCESSING SYSTEM HAVING TRIPLEXED SYSTEM UNITS

BACKGROUND OF THE INVENTION

This invention relates to a circuit arrangement for detecting and isolating malfunctioning system units of a program controlled data processing system having processing units and a central storage unit, wherein the individual system units are multiplexed to increase the operational reliability.

In known program controlled processing systems employed with particular advantage as a program controlled telecommunication switching system, a series of system units are available as processing units, wherein program controlled processing operations are capable of being performed. The programs and data required therefor are held in a central storage unit which may be considered, as well, as a system unit.

The processing units always communicate with one another through the central storage unit. This occurs in a manner such that a processing unit in which a process is to be performed requests of the storage unit storage cycles in accordance with the tasks to be performed. An exchange of information with the central storage unit always takes place within an allotted cycle. Both the request and the allocation of storage cycles take place through a central control in the storage. This storage control processes the cycle requests, for example, in accordance with the priorities of the tasks to be performed, and cycles are assigned to the requesting processing units accordingly. This mode of operation is well known in the art and is described, for example, in German Unexamined Pat. application 1,944,483.

A commonly used technique for enhancing the operational reliability and the dependability of such a processing system is to duplicate the individual system units. Due to the interchangeability of individual system units in this type of construction, known as modular construction, there is the possibility that the system function of one system unit can be assumed by others of the system units in case of failure. This duplication of system units can be applied to the processing units, as well as to the system units operating as storage units. The processing units are each connected to each of the two storage units through two standard connections. It is also possible to place malfunctioning system units in a testing state and to cause them to be diagnosed by the remainder of the system, which remains intact.

It is known in the art to further enhance the operational reliability of such a processing system by triplicating the system units instead of duplicating them (See West German application Ser. No. P2 153 830.7). As in the duplexed system, the triplexed system is, likewise, provided with a double standard connection to each of the system units, and the processing units are cyclically connected to the three storage units. Comparators are allocated to the double standard connections which, upon receiving dissimilar data through the double standard connections, cause the delivery of an error signal to the two system units connected to the corresponding double standard connection. Compared with the duplexed system, a malfunctioning system unit cannot only be detected but also located, through the evaluation of such error signals. However, a triplexed system so designed has the disadvantage that the parallel data flow through the double standard connections must be delayed until the comparison result of the comparators is available, or else there is the danger that the system units will receive incorrect data. Moreover, there is the disadvantage that each of the individual processing units has access to only two of the three storage units, so that the full possible redundancy of a triplexed system is not achieved.

This invention has as an object the provision of a processing system having triplicated system units without the disadvantages of an older proposal described above. A particular disadvantage that must be overcome is that if a system unit breaks down, the rest of the system that remains intact can operate without further interruption and that a fault-free system unit does not receive faulty data.

SUMMARY OF THE INVENTION

The foregoing and other objects of the invention are achieved by the invention in that in a processing system comprising triplicated and/or duplicated system units, wherein the processing units are each connected to the storage units through triple standard connections, a combination of a comparator with a majority logic circuit follows each triple standard connection of a system unit for the incoming data traffic. Thus, the comparator has a connection with two standard connections and a majority logic circuit with all three standard connections of a triple standard connection. By this means, the comparator evaluates the data received at two standard connections, and the majority logic circuit evaluates the data received at three standard connections.

In an advantageous embodiment of the invention, the three comparators of a triplicated system unit having three units, each being connected with each unit of another triplicated system unit, are connected with two standard connections, through which two different units of the other triplicated system unit are connected. Moreover, in a combination of a duplicated system unit with a triplicated system unit, the two standard connections in the units of the triplicated system unit are each seized with communications to the two units of the duplicated system unit. These are connected with one comparator at a time, while the two comparators in the duplicated system unit are connected with two standard connections each, through which two different units of the triplicated system are connected.

A further development of the invention includes a majority logic circuit comprising, for example, three first NAND gates having two inputs each and an additional fourth NAND gate having three inputs. The inputs of the three first gates are so interconnected that the two inputs of a gate are connected with one input of the two other gates, and the outputs of the three first gates are connected with the three inputs of the fourth gate at a time.

BRIEF DESCRIPTION OF THE DRAWINGS

Details of the invention will be explained with the aid of a preferred embodiment shown in the drawing, wherein.

DETAILED DESCRIPTION OF THE DRAWINGS

Figure 1:
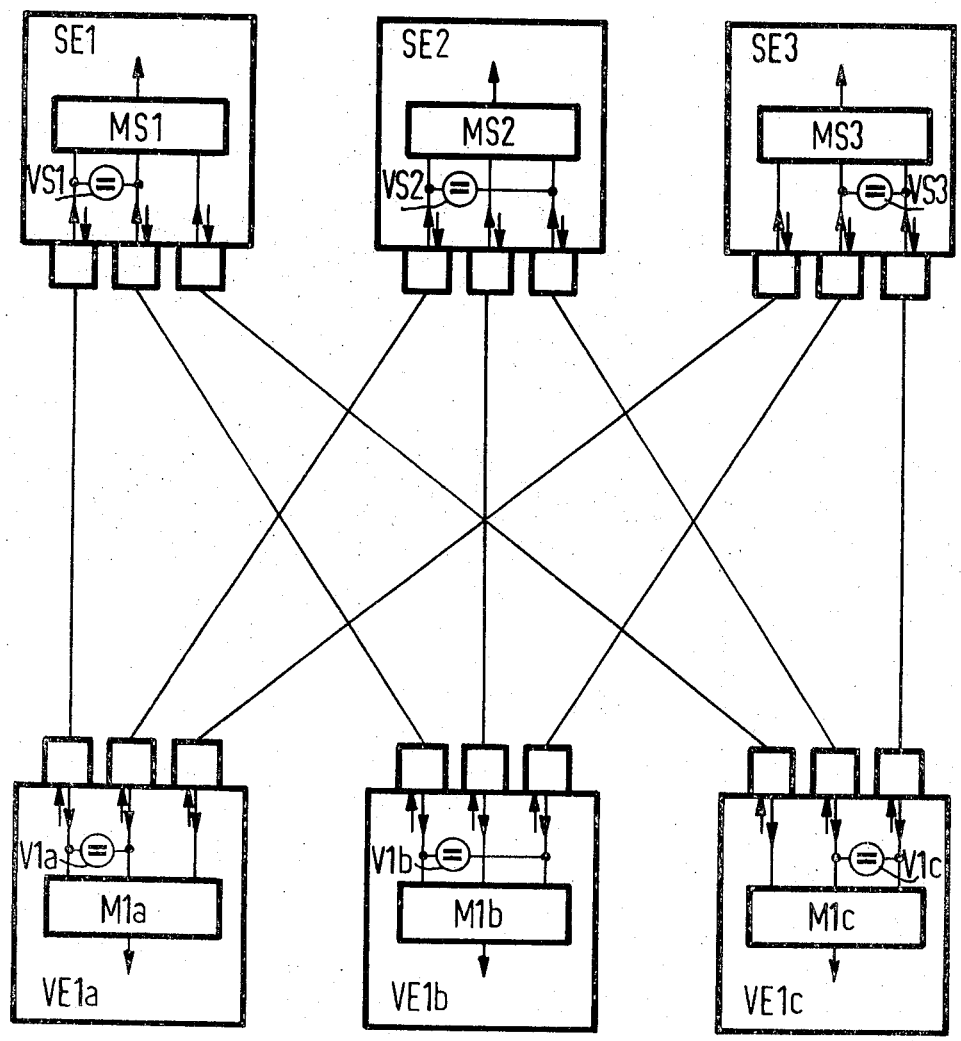
FIG. 1 is a block diagram of a processing system having triplicated system units, wherein the combination in accordance with the invention of a comparator with a majority logic circuit is illustrated in the system units.

FIG. 1 shows in detail one triplicated storage unit (SE1, SE2, SE3) and one triplicated processing unit (VE1a, VE1b, VE1c) as an example. It goes without saying that within the processing system a plurality of triplicated or, as will be explained hereinbelow with reference to FIG. 2, duplicated processing units may be provided. However, for clearer description, only one triplicated processing unit is illustrated in FIG. 1, since the contents of each individual triplicated unit are the same.

The processing units VE1a, VE1b, VE1c and the storage units SE1, SE2, SE3 are each provided with triple standard connections, through which each processing unit has a connection with each of the three storage units. Thus, each processing unit has access to each of the three storage units, which hold the data and programs needed for the operation of the processing units. If a plurality of processing units are provided in the processing system, then the storage unit has a triple standard connection for each processing unit.

Figure 2:
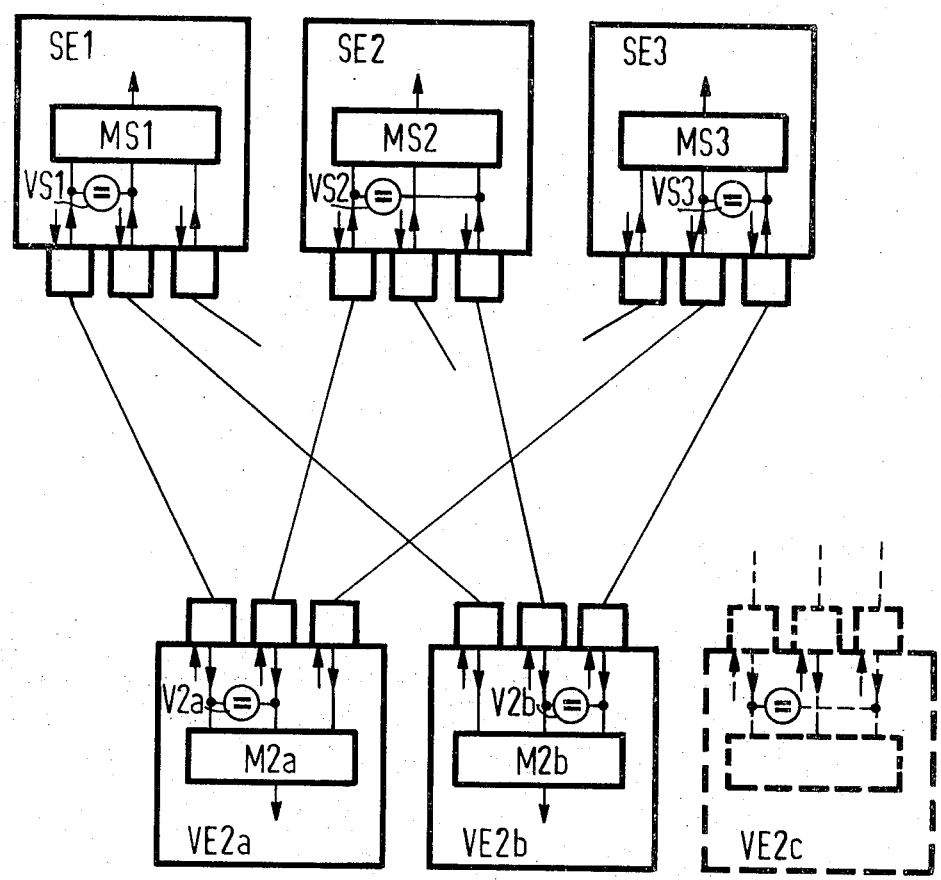
FIG. 2 is a block diagram of a processing system, wherein the system units designed for the operation of FIG. 3 is a circuit diagram of a preferred embodiment of a majority logic circuit in accordance with the invention.

The data processing system shown in FIG. 1, as well as the system in FIG. 2, is of known construction, as are the individual system units. A detailed description of a processing system which can be used with this invention will be found in U.S. Pat. No. 3,551,892.

Since the multiple (in this case triplexed) arrangement of the system units is provided so as to achieve an adequate redundancy, three identical system units at a time are available which operate synchronously. If a malfunction occurs in a system unit, there is the possibility, as will be described hereinbelow, of isolating this defective system unit immediately from the rest of the system, which remains intact, and isolating the same, so that the total system can continue to operate without any restrictions.

However, in order to be able to diagnose a malfunctioning system unit through the rest of the system that remains intact, it is necessary first of all to detect and locate the malfunctioning system unit. To achieve this purpose, comparators VS1 to VS3 and V1a to V1c are provided in the individual system units following the two standard connections. These comparators may be constructed as conventional data or pulse comparators, which are known in the prior art. In the three identical storage or processing units the comparators are assigned, with respect to the spatial sequence, to two different standard connections and, consequently, to two different opposite system units. The comparators monitor the incoming data traffic at the standard connections assigned thereto to discover whether they are identical.

For better comprehension, the operation of the comparators, which is the same in all system units, will be explained in greater detail with reference to an example. In the first storage unit SE1 the comparator VS1 is connected to the first and second standard connections, counting from the left. Since the first and second processing units VE1a and VE1b are connected to the first storage unit SE1 through the two standard connections, the comparator VS1 monitors the data traffic from the two processing units VE1b, VE1a to the storage unit SE1 to discover whether they are identical. In similar fashion, the comparator VS2 in the second storage unit SE2 monitors the data traffic from the first and third processing unit VE1a and VE1c and the comparator VS3 in the third storage unit SE3 the data traffic from the second and third processing unit VE1b, VE1c. Now, if, by way of example, the processing unit VE1a is malfunctioning and data are written from the processing units VE1a, VE1b, and VE1c into the storage units, the data which are transmitted from the first processing unit will not agree with the data transmitted by the two other properly functioning processing units VE1b and VE1c, because of the malfunction. This has as a consequence that the comparators VS1 and VS2 operate and react in the form of an error signal to the processing units VE1a, VE1b, and VE1c. Only in the third storage unit SE3 does the comparator VS3 not operate, since this comparator monitors only the error-free data from the second and third processing unit VE1b, VE1c. Consequently, in the case of a malfunctioning processing unit VE1a two error signals are sent to this faulty unit alone, namely, from the first and second storage unit SE1, SE2; the properly functioning processing units VE1b, VE1c receive only one error signal each. This forms a criterion for locating the defective system unit VE1a. To this end, all system units (i.e., also the processing unit VE1a) have known means (not shown), e.g., logic circuits, which identify this unit as faulty upon receiving two error signals. Similarly, also the two other processing units VE1b and VE1c are identified as faulty, if an error occurs therein.

Since the processing units VE1a, VE1b, VE1c are provided with comparators V1a, V1b, V1c in the same manner as described in connection with the storage units for monitoring the data traffic from the storage units to the processing units, a malfunctioning storage unit is located in the same manner as described with reference to a defective processing unit.

However, the comparators alone are not sufficient for monitoring the processing system for detecting malfunctions or countering the effects of errors. In this connection, the problem of the undesired reception of false data by a system unit is important. If such reception of false data is not prevented, there is the danger that properly functioning processing units operate incorrectly, or that upon the occurrence of a defect in a processing unit, false information is written into all three storage units, so that the processing system is no longer in working order as a unit.

The comparators themselves have no means for blocking reception of false information by the system unit. Certainly, the data flow entering the system units could be stopped bitwise or characterwise until the result of the evaluation of the comparison is available. Depending on this evaluation of the comparison, the information path would be opened if the data being compared were identical, or the information path would be blocked if there was no identity, or, upon the occurrence of an error signal. However, it would be a disadvantage if the flow of information were constantly delayed. Moreover, in each system unit only the data received at two standard connections would be monitored by a comparator, so that faulty data could get into the system unit through the third standard connection despite the previously described safety measure using the comparator.

Figure 3:
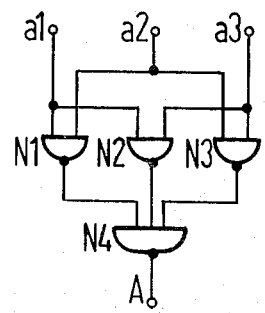

To overcome these disadvantages, the invention provides in the system units, in addition to the comparators, a majority logic circuit (MS1, MS2, MS3, or M1a, M1b, M1c) following each of the triple standard connections. This majority logic circuit, which is fully described with reference to FIG. 3, is connected to each of the three standard connections of a triple standard connection in a system unit. Within the majority logic circuit, the identical data received at the three standard connections are concentrated on a common output, the majority logic circuit being so constructed that the faulty data received at a standard connection, which thus do not agree to the data received at the two other standard connections, are not taken into consideration.

By this combination within each system unit, i.e., the combination of a comparator with a majority logic circuit, a system having triplicated system units is capable of detecting and locating faulty system units by means of the comparators, as well as preventing faulty data from getting into a system unit by means of the majority logic circuits. Thus, the system units which are properly functioning in the processing system are protected from receiving faulty data without delaying the input of data into the system units.

If an error occurs in a system unit, the faulty unit is automatically isolated from the rest of the processing system, because the data transmitted thereby are not taken into consideration by the three system units receiving these incorrect data. The rest of the system that remains intact continues to operate in this case without interruption and without impairing the working order. Furthermore, as is known, there is the possibility of placing a malfunctioning system unit in a testing state to discover the source of the error and to have this unit diagnosed by other properly functioning system units.

If a system unit is defective and an error occurs in another system unit, identical or not, other features have to be considered which will be discussed in detail with reference to FIG. 2.

FIG. 2 shows a processing system, wherein the system units are triplicated and duplicated. Since the probability of failure and the redundancy request with respect to the individual system units may be different, it is reasonable in such circumstances to triplicate important system units and duplicate less important system units. In this connection, there should be a possibility of triplicating later system units that have first been duplicated.

Since the individual processing units only communicate through the central storage unit, so that the processing system is no longer operative as a unit if a storage unit breaks down, it is advantageous, first of all, to triplicate the storage unit and duplicate the processing units that are less important for the working order of the entire system. In order to be able to discuss in detail the combination of triplicated and duplicated system units, an example will be described, wherein only one triplicated and one duplicated system unit are present.

FIG. 2 shows a processing system having two identical parallel running processing units (VE2a, VE2b), which are connected to three identical parallel running storage units (SE1, SE2, SE3). As in the completely triplexed system, the processing units and the storage units are each equipped with triple standard connections and a combination of a comparator with a majority logic circuit. Each of the processing units is, likewise, connected to each of the three storage units through the standard connections. One standard connection to each storage unit remains unseized as a result of the breakdown of the third processing unit. In the storage units, the two standard connections with a connecting cable to the processing units which are each followed by a comparator (VS1, VS2, VS3) are seized. Only in this way are the comparators in the storage units in this case operative, that is to say, they can compare between the data transmitted from the two processing units VE2a and VE2b.

The third standard connection of the storage unit which is not used is every time driven with a logic zero or one criterion, so that the following majority logic circuits MS1, MS2 and MS3 consider unambiguously only the data transmitted from the two processing units VE2a and VE2b.

If an error occurs, this error may occur in one of the triplicated storage units or in one of the duplicated storage units. In both cases, additional means and steps are needed to locate a malfunctioning unit as compared with a fully triplexed system structure, which are partly different in the individual identical system units.

If, for example, a malfunction occurs in the first storage unit SE1, only the comparator V2a in the first processing unit VE2a comes into action. However, the sole reaction of the comparator V2a is not sufficient to locate the faulty unit SE1 in the manner described with reference to FIG. 1. Neither does the criterion error signal from the first processing unit VE2a and the error signal from the second processing unit to the first storage unit SE1 suffice, since these conditions would also apply if there was a malfunction in the second storage unit SE2. Consequently, the first storage unit would erroneously be evaluated as faulty. Therefore, an evaluation of the reactions of the comparators V2a and V2b in the processing units VE2a and VE2b, namely in connection with one another, is brought about, because a known logic circuit (not shown) follows the two comparators V2a and V2b. This logic circuit is so constructed that a specific combination of the reactions of the comparators is allocated to a specific output signal of the logic circuit. This output signal forms a criterion for identifying a faulty storage unit. Thus, if an error occurs in the first storage unit SE1, only the comparator V2a comes into action, while the comparator V2b does not have any reaction. The output signal of the logic circuit assigned to this combination of the reactions of the comparators unambiguously identifies the first storage unit as faulty. Similarly, where applicable, a malfunctioning second storage unit SE2 is located as faulty through the reaction of the two comparators V2a and V2b, and a malfunctioning third storage unit SE3 through the sole reaction of the comparator V2b. It must always be assumed that only one storage unit at a time is defective.

If an error is produced in one of the duplicated processing units VE2a, VE2b, then practically the same case occurs as when two units of a triplicated system unit fail one after another. In this case, as in a fully duplexed system structure, there is no possibility of locating a faulty processing unit (VE2a, VE2b), because of the reaction of the comparators in the opposite system units, i.e., in the storage units in this case. For this reason, wired-in or programmed checks are provided in the processing system to identify a malfunctioning duplicated system unit, i.e., a processing unit (VE2a, VE2b) in this case and to identify a malfunctioning triplicated system unit, in which one of the three part units is defective. If the storage unit is duplicated, there is the possibility of identifying a faulty storage unit through a parity check instead of a wired-in or programmed check.

It has been shown that each of the majority logic circuits following the triple standard connections prevents reception of faulty data by a system unit even if triplicated system units are combined with duplicated system units. Thus, if there is a malfunction in a storage unit owing to the majority logic circuits M2a, M2b, only the correct data transmitted by the two properly functioning storage units are received by the processing units VE2a, VE2b. Conversely, if a malfunction occurs in a processing unit (VE2a, VE2b), the storing of data into the storage units SE1, SE2, SE3 through the respective majority logic circuits MS1, MS2, MS3 is prevented without causing any delay.

An expansion of a duplicated system unit into a triplicated system unit can advantageously and simply be effected. To achieve this purpose, a third practically identical processing unit VE2c shown in dotted line in FIG. 2 is added for the subsequent tripling of the duplicated processing units VE2a, VE2b and VE2c resulting therefrom are thereafter connected to the three storage units SE1, SE2 and SE3 in the manner shown with reference to FIG. 1. Thus, if a duplicated system unit is expanded into a triplicated system unit, all that needs to be done is to change the connecting cable to the standard connections of the system units.

FIG. 3 shows a preferred construction of a majority logic circuit which in the individual system units follows the triple standard connection.

The majority logic circuit has three inputs $a1$, $a2$ and $a3$, each of which is connected to one of the aforementioned three standard connections. Three NAND gates N1, N2 and N3 with two inputs each follow the inputs $a1$, $a2$ and $a3$, such that one input of two of the three gates N1, N2 and N3 is connected to one input of the majority logic circuit. In the embodiment shown, the two first inputs of gates N1 and N2 form the input $a1$, the two second inputs of gates N2 and N3 form the input $a3$, and the first and second input of gates N3 and N1 form the input $a2$ of the majority logic circuit. Immediately thereafter, the outputs of gates N1, N2 and N3 are each connected with one of the three inputs of another NAND gate N4, the output of gate N4 at the same time constituting the output A of the majority logic circuit. On account of the majority logic circuit, only identical signals at the three or at least at two of the three inputs $a1$, $a2$ and $a3$ reach the output A.

The construction of the majority logic circuit is not limited to the embodiment shown for illustrative purposes only, but may be varied with respect to the logic elements as well as with respect to the wiring thereof.

Figure 4:
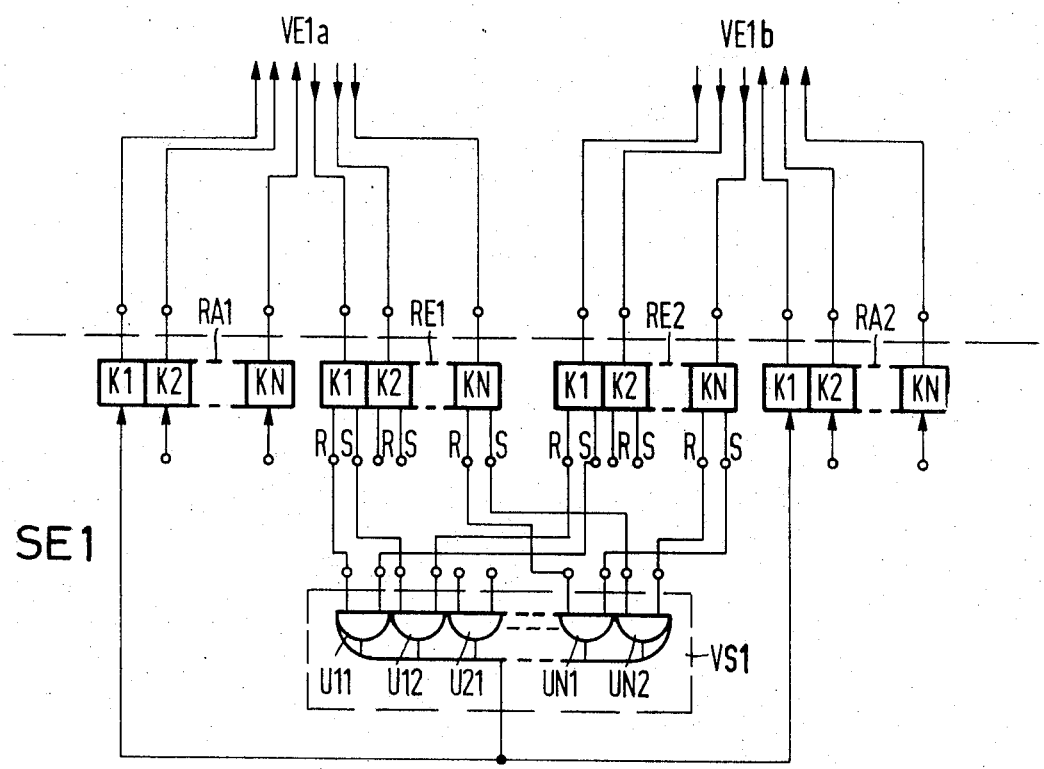
FIG. 4 is a schematic diagram illustrating a preferred construction of the comparators, as well as the standard connections, in the FIGS. 1 and 2 embodiment.

For a detailed description of the mode of operation of a comparator, reference is made to FIG. 4, wherein the comparator is connected with two parallel standard terminals. The construction of all standard terminals and all comparators connected to the parallel standard terminals is fundamentally the same. Therefore, in the drawing only one comparator, as well as its connection to the parallel standard terminals in the storage unit SE1, is shown. Each standard terminal comprises an input register RE and an output register RA. These registers are of conventional construction and are constituted by a plurality of bistable stages. The information signals are written into the system unit concerned through the input register RE. Conversely, they are read out through the output register RA.

A comparator is disposed in each system unit. Thus, in FIG. 4, the storage unit SE1 is provided with a comparator VS1, which is connected to two parallel standard terminals. These two parallel standard terminals are associated with the input registers RE1 and RE2, as well as with the output registers RA1 and RA2. The inputs of register RE1 and the outputs of register RA1 are each connected with a similar standard terminal of the processing unit VE1a, and the inputs of register RE2, as well as the outputs of register RA2, are similarly connected with the corresponding standard terminal of the processing unit VE1c. Each of the input and output registers of the standard terminals comprises N bistable stages K1 to KN. The outputs of the bistable stages of input registers RE1 and RE2 are each represented by the setting and resetting outputs S and R.

The comparator VS1 connected to the outputs of the parallel input registers RE1 and RE2 comprises 2×N AND gates U11 to UN2, which have two inputs each and whose outputs are connected to a common output through an OR-gate or the like.

In the comparator VS1, the output signals from the parallel bistable stages of input registers RE1 and RE2 are each monitored separately with a view to supervising the identity of the parallel information. Thus, the outputs of bistable stages K1 of the input registers are checked by the two AND gates U11 and U12. To this end, the resetting output R of bistable stage K1 of input register RE1 is connected with the left input of AND gate U11, and the right input of this AND gate is connected with the setting output S of the bistable stage K1 of input register RE2. The setting output S of bistable stage K1 of input register RE1 is similarly connected with the left input of AND gate U12, whose second input is connected to the resetting output R of bistable stage K1 of input register RE2.

Since in a faultless operation, identical data are written into the storage unit SE1 through the input registers RE1 and RE2, in this case no output signal is transmitted to the output of comparator VS1. If, however, different signals appear at the outputs of the bistable stage K1 of input registers RE1 and RE2, a signal is produced either at the output of AND gate U11 or of AND gate U12 and, thus, at the output of comparator VGL. This output signal of comparator VS1 is sent to the connected system units through one of the bistable stages of the output registers. For example, it is sent through the bistable stage K1 of output registers RA1 and RA2 in the processing units VE1a and VE1c, triggering an error reaction therein.

The invention has been described hereinabove through a description of a preferred embodiment, by which the advantages of the invention can be realized. This description is not to be considered as limiting. This preferred embodiment may be modified or changed without departing from the spirit or scope of the invention, as defined by the appended claims.

We claim:

1. Circuit for detecting malfunctioning system units of a data processing system, said system units being processing units and storage means, said system units being interconnected to provide redundancy in case of malfunction, the arrangement comprising:

standard data connection means through which each said processing unit is connected to each said storage means, the number of standard data connection means on one said system unit corresponding to the number of others of said system units to which said one system unit is connected, comparator means connected after each said standard data connection for incoming data traffic, each said comparator being connected to two standard connection units of a said standard data connection, and majority logic circuit means connected after each said standard data connection means in each said system unit, each said majority logic circuit being connected to all of the standard connection units in a system unit, whereby each said comparator evaluates data received at two standard connections of a said standard data connection means and each said majority logic circuit evaluates data received at all of the standard connection units of a said standard connection means.

2. The circuit arrangement defined in claim 1 having a combination of duplicated system units with triplicated system units and wherein the two standard connections in each system unit of the triplicated system units are connected to the two units of said duplicated system units, each said system unit being connected to a said comparator means, the two comparators in each said duplicated system unit being each connected to two standard connections, through which two different units of the triplicated system unit are connected.

3. The circuit arrangement defined in claim 2 wherein said majority logic circuit comprises:

three first NAND gates having two inputs each, the inputs of said first gates being interconnected such that two inputs of a said first gate are connected, respectively, to one input of each of the other two of said first gates and a second NAND gate having three inputs respectively connected to the three outputs of said first gates.

* * * * *